Figure 1:
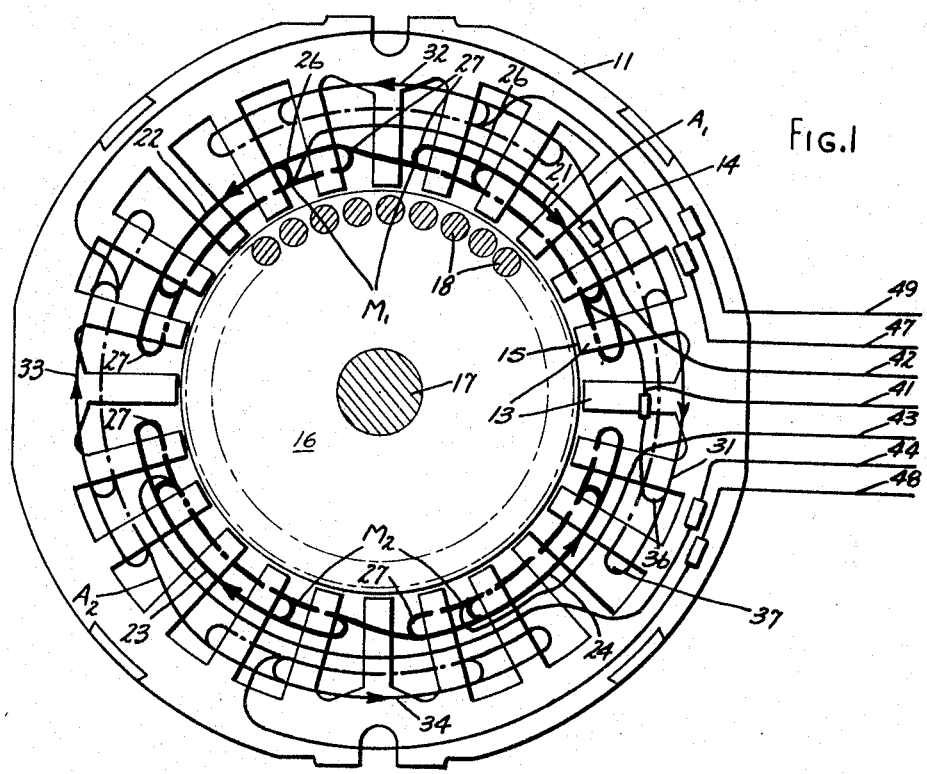

April 25, 1967  E. A. HOLDGREVE  3,316,471

MULTI-VOLTAGE ALTERNATING CURRENT ELECTRIC MOTOR

Filed Jan. 11, 1965

LOW VOLTAGE

HIGH VOLTAGE

INVENTOR.
EUGENE A. HOLDGREVE,
BY
John M. Studt
ATTORNEY.

though any suitable wire may be used. The coils of each group 21-24 are serially connected with one another and arranged to develop a pole of opposite magnetic polarity to those formed by immediately adjacent groups. Thus, for example, while the group 21 is forming a north pole in the stator core, the immediately adjacent groups 22 and 24 form south poles in the core with the remaining group 23 forming a north pole at the same time. The winding groups 21-24, therefore, are adapted to form four magnetic poles in the stator core during starting and running conditions of the motor.

United States Patent Office
3,316,471
Patented Apr. 25, 1967

3,316,471
MULTI-VOLTAGE ALTERNATING CURRENT ELECTRIC MOTOR
Eugene A. Holdgreve, Fort Wayne, Ind., assignor to General Electric Company, a corporation of New York
Filed Jan. 11, 1965, Ser. No. 424,599
4 Claims. (Cl. 318—225)

This invention relates to multi-voltage alternating current electric motors and more particularly to an improved single-phase, dual-voltage motor of the permanent split-phase capacitor type adapted for selective operation on either one of two different voltages.

Certain electric motor domestic applications, such as electric typewriters, which may be employed in offices and other locations where noise is objectionable, require motors which operate with as little noise as possible and with a minimum of noise producing forces. In addition, in view of the possible use of power sources of differing voltage levels to excite the motors, it is desirable under these circumstances that the motors be capable of selective operation on at least two different voltage inputs, such as 115 and 230 volts at a frequency of either 50 or 60 cycles per second.

Consequently, due primarily to their inherently low noise level of operation and versatility, in the past, single-phase, dual-voltage electric motors of the permanent split-phase capacitor type have been utilized for these applications. The motors conventionally incorporate a stator member having a magnetic core with a distributed wound main or primary winding and a distributed wound auxiliary winding physically displaced on the core from the main winding. This construction produces a space phase in the winding currents which are also displaced from each other in time phase which in the usual arrangement is primarily accomplished by such phase displacing or splitting means as a capacitor connected in series with the auxiliary winding during both starting and running conditions. In one approach, a different capacitor is employed for each voltage level of operation in an effort to achieve a somewhat constant torque output for the motor, regardless of the voltage condition under which the motor is operating. This, of course, necessitates the use of several separate capacitors of various capacitance ratings matched to the voltage condition which has not been too satisfactory from the standpoints of added cost, space required for accommodating the capacitors, and general inconvenience.

Other approaches attempt to overcome these deficiencies by using the same capacitor for high and low voltage operation while changing the circuit relation of so-called main winding sections to each other. The approaches discussed in the Buchanan Patent 2,459,615, issued Jan. 18, 1949, are typical. However, difficulties have been encountered with these latter approaches, since the use of the single capacitor and main winding sections has not resulted in dual-voltage operation providing approximately the same torque output at each voltage level. In addition, the noise level has been somewhat increased in practicing these latter approaches as compared with the employment of dissimilar capacitors matched to the individual voltage conditions.

Consequently, it is the primary object of the present invention to provide an improved multi-voltage alternating current motor capable of utilizing a single phase-splitting means for different voltage conditions of operation.

It is another object of the present invention to provide an improved dual-voltage single-phase electric motor which not only operates at a relatively low noise level, but in addition, produces a somewhat constant torque output at different voltage conditions.

In carrying out the objects in one form, I provide an improved dual-voltage single-phase permanent split-phase capacitor electric motor with a stator member carrying a main and auxiliary winding electrically displaced from one another. Each winding is comprised of two sections formed by at least one group of coils arranged on a stator core to form a corresponding number of operating poles. The auxiliary winding is connected in series relation with phase splitting means, such as a capacitor, and in parallel with a main winding. For start and run operation at a low voltage condition, such as 115 volts, the main winding sections are connected in parallel while the auxiliary winding sections are serially connected. For start and run operation at a higher voltage level; e.g., 230 volts, the main winding sections are connected in series while the auxiliary winding sections are connected in parallel. This arrangement not only provides quiet operation for the motor, but in addition, permits the use of the same capacitor means at each voltage level to produce approximately an equivalent output torque at the two voltage levels.

Figure 2:
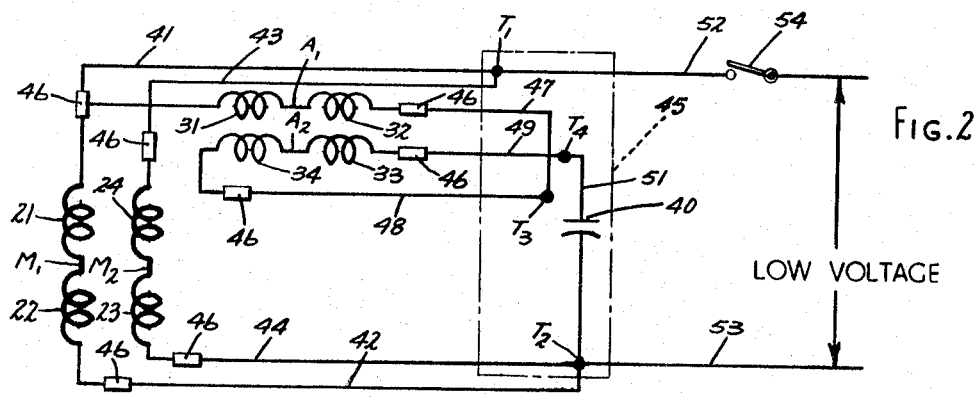
Figure 3:
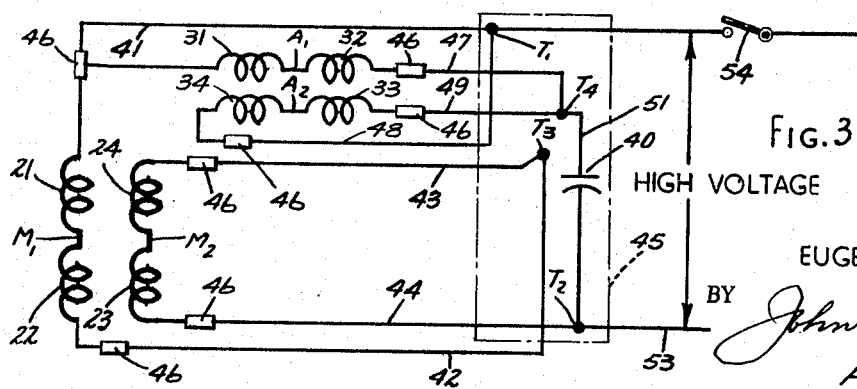

The subject matter which I regard as my invention is particularly pointed out and distinctly claimed in the concluding portion of this specification. My invention itself, however, both as to its organization and method of operation, together with further objects and advantages thereof, may best be understood by reference to the following description taken in connection with the accompanying drawings in which:

In the drawings:
FIGURE 1 is an end elevational view, partially schematic, of stator and rotor members incorporated in a dual-voltage, single-phase permanent split-phase capacitor motor, with the stator including the preferred embodiment of one form of my invention and being adapted to operate selectively at two different voltage levels;

FIGURE 2 is a schematic wire diagram of the stator winding arrangement for the stator member of FIGURE 1, showing the electric connections for the low voltage operation; and FIGURE 3 is a schematic wire diagram similar to that of FIGURE 2, displaying the electrical connections of the stator windings for the high voltage operation.

Turning now to a more detailed description of the drawing, one form of the present invention is illustrated as being incorporated in a four-pole, dual-voltage, single-phase capacitor electric motor of the permanent split-phase type. As seen in FIGURE 1, the motor of the exemplification is provided with a stator member 11 having the customary laminated core fabricated from a stack of laminations, stamped out of magnetic sheet material, to form a yoke 12 and angularly spaced apart teeth 13, twenty-four equally spaced teeth in the exemplification. The teeth define a corresponding number of winding accommodating slots 14 and a rotor-receiving bore 15 at their inner ends. The rotor member 16 is of standard construction, including a cylindrical laminated magnetic core securely mounted to rotate with shaft 17. The core carries the well-known squirrel-cage type rotor winding conventionally formed by a plurality of spaced apart conductors 18 extending axially through the rotor core and electrically joined at each end by the usual end rings; 35 conductors is a typical number.

In the illustrated embodiment of the present invention, a main field winding of the distributed type, shown by the heavy lines in the drawing, is accommodated in the slots 14 of the stator core and comprises four identical coil groups 21-24 inclusive, each composed of two concentric coils, 26, 27 arranged to furnish four primary poles for starting and running conditions. Coils 26 and 27, in turn, are wound from a selected number of turns of suitable insulated wire, such as enameled copper, and distributed in the slots such that an approximate sinusoidal wave form for the flux distribution at these individual poles is achieved. In addition, the coils are so arranged in the slots that adjacent primary poles, as indicated by the arrows depicting current flow in the coil groups in FIGURE 1, are of opposite instantaneous polarity. Coil groups 21 and 22 are serially connected to provide a first section $M_1$ for the main winding while serially connected coil groups 23, 24 similarly provide a second section $M_2$ of the winding.

An auxiliary winding displaced 90 electrical degrees from the main winding in slots 14 is similarly comprised of four identical coil groups 31-34 inclusive, with each coil group including two concentric coils 36, 37, to define four secondary poles. These coils are also wound of a selected number of wire turns and distributed to approximate a sinusoidal wave form for the polar flux distribution. The secondary poles are of alternately opposite instantaneous polarity, depicted by the arrows showing current flow in the first figure of the drawing. In the auxiliary winding, coil groups 31 and 32 are serially joined and define a first section $A_1$, with the other two coil groups 33 and 34 providing a second auxiliary winding section $A_2$.

For low voltage (e.g., 115 volts) start and run operation, the main and auxiliary windings are connected in parallel as revealed in FIGURE 2 with a phase displacing or splitting element, such as capacitor 40, serially joined to the auxiliary winding. Further, main winding coil groups 21 and 22 are arranged in parallel circuit with coil groups 23, 24; that is, sections $M_1$ and $M_2$ are connected in parallel with one another. Conversely, auxiliary coil groups 31, 32; i.e., section $A_1$, are joined in series to the coil groups 33, 34 of section $A_2$.

The concurrent energization under low voltage conditions of all of the coil groups from a power source of alternating current may be accomplished in any suitable manner. By way of example, conductors 41, 42 and conductors 43, 44, respectively, connect main winding sections $M_1$ and $M_2$ in parallel across a pair of input terminal posts $T_1$, $T_2$ of a four-stud terminal board 45, shown by the broken lines in FIGURE 2. Standard connectors 46 are used to join one end of the individual conductors to the winding section terminations.

In order to place the auxiliary winding sections $A_1$, $A_2$ in series with one another and the entire winding in parallel with the main winding, one end of section $A_1$ is electrically joined to conductor 43 and its other end removably attached to terminal post $T_3$ by conductor 47. Conductor 48 removably connects one end of auxiliary section $A_2$ to terminal post $T_3$ while the other end is in circuit with terminal post $T_4$ through conductor 49. Standard connectors 46 may also be used to secure the terminations of the two auxiliary winding sections to the ends of the above-identified conductors. Terminal post $T_4$ is permanently connected in series relation to input terminal post $T_2$ through capacitor 40 and its bridging conductor 51.

Input posts $T_1$, $T_2$ are, in turn, connected to the source of alternating current power, such as 115 volt, 60 cycle source, by lines 52, 53 with line 52 including a manually operated, "on-off," single-pole switch 54 to control the excitation of the windings. Thus, closing of switch 54 will apply power to input posts $T_1$, $T_2$ and hence to capacitor 40 and the winding sections $M_1$, $M_2$, $A_1$, $A_2$, having the circuit relationships already described, to produce the four primary and secondary poles of alternating opposite polarity shown in FIGURE 1.

In order to operate the motor at a higher voltage, such as 230 volts, and still produce about the same output torque with quiet operation while at the same time, utilizing the same capacitor 40, main winding sections $M_1$, $M_2$ are connected in series while the auxiliary winding sections $A_1$, $A_2$ are excited in parallel relation to one another. Further, the main and auxiliary windings as a whole are still maintained in parallel, with capacitor 40 in series circuit to the auxiliary winding.

High voltage operation may readily be achieved by merely disconnecting main auxiliary winding conductors 47, 48 from terminal post $T_3$ and reconnecting conductor 47 to post $T_4$ and conductor 48 to input post $T_1$. Further, main winding conductors 42, 43, respectively, are reconnected from terminal input posts $T_1$, $T_2$ to terminal post $T_3$. Thus, when switch 54 is closed to initiate high voltage operation, main winding sections $M_1$ and $M_2$ will be serially connected across posts $T_1$, $T_2$, through post $T_3$. The auxiliary winding section $A_1$ and $A_2$ will be in parallel across posts $T_1$ and $T_4$, with post $T_4$ still being permanently connected to input post $T_2$ through capacitor 40 and its bridging conductor 51. Like the low voltage connection, high voltage operation will produce the polar relationships for the windings displayed in FIGURE 1.

The following example is given to illustrate how the invention as described above has been carried out in actual practice and the advantages and benefits which can be derived therefrom. Several stator members were similarly fabricated in the preferred form as already outlined and revealed in the drawing. The cores had a nominal bore diameter of 2.005 in., an outer nominal diameter of 3.7025 in., and a nominal stack length of one inch. Coils 26 and 27 of the main winding included 225 and 336 turns respectively of .010 in. diameter copper wire having a total winding resistance in the neighborhood of 128 ohms distributed to provide the four poles of operation as pictured in FIGURE 1. With respect to the auxiliary winding, it was formed of .011 inch diameter copper wire having 189 and 368 turns respectively for coils 36 and 37, and a total winding resistance of about 101 ohms. Capacitor 40, in series with the auxiliary winding had a four microfarad capacitance.

The winding sections were connected with the relationships shown for the low and high voltage operations illustrated by FIGURES 2 and 3 and were tested at both 115 and 230 volts with frequencies of 50 and 60 cycles per second (c.p.s.). The following tabulation is typical of the performance attained under these conditions:

|  | 60 c.p.s. | | 50 c.p.s. | |
| --- | --- | --- | --- | --- |
|  | 115 volts | 230 volts | 115 volts | 230 volts |
| Maximum torque in ounce-feet | 3.90 | 3.57 | 4.48 | 3.72 |
| Slip torque in ounce-feet | 2.98 | 2.33 | 2.88 | 2.32 |
| Noise level in decibels measured with 6 inch microphone position | 43 | 44 | 41 | 41 |

Under all test conditions, motor tested cool.

It will be appreciated from the above results that a dual-voltage motor incorporating my invention produces unusually high torques. In addition, it is possible to furnish dual-voltage operation where the maximum torques do not vary greatly between the low and the high voltages. For instance, in the above example the maximum output variation for the 60 c.p.s. frequency was only 8%. Since the capacitive reactance of the phase-splitting capacitor has a greater influence at 50 c.p.s. on the ultimate output, the variation was approximately double, that is, in the neighborhood of 16%. Moreover, the noise level for all operative conditions was under 45 decibels, a level quite satisfactory for domestic applications where noise might be objectionable.

From the foregoing, it will be recognized that the present invention provides an improved single-phase, dual-voltage electric motor of the permanent split-phase capacitor type which is capable of producing unusually high output torque of about the same magnitude for both low and high voltage operation while incorporating a single, phase-splitting means, such as a capacitor, to achieve this desirable performance. Moreover, the motor operates at a relatively low noise level for both voltage conditions and is quite suitable for use in domestic applications where noise is a problem.

It should be apparent that while I have described the present embodiment as applied to a four-pole arrangement 115 and 230 voltages, and frequencies of 50 and 60 cycles, the principles enunciated above are equally applicable to other arrangements, voltages and frequencies of operation. Consequently, while I have shown and described what is considered to be the preferred embodiment of my invention in accordance with the patent statutes, it will be obvious to those skilled in the art that changes and modifications may be made in the disclosed structure without departing from my invention, and it is, therefore, aimed in the appended claims to cover all such changes and modifications as fall within the true spirit and scope of my invention.

What I claim as new and desire to secure by Letters Patent of the United States is:

1. In a dual-voltage single-phase alternating current induction type motor, a stator member having a core, a distributed main winding comprising two sections formed by at least one group of coils arranged on the core, with each coil group defining a primary operating pole; a distributed auxiliary winding carried by said core electrically displaced from said main winding, said auxiliary winding comprising two sections formed by at least one group of coils defining a corresponding number of secondary operating poles; said auxiliary winding being connected in series with capacitor means and in parallel with said main winding; said main winding sections being connected in parallel and concurrently said auxiliary winding sections being connected in series for operation at a first lower voltage whereby the motor is capable of producing a predetermined torque level at said first lower voltage; and said main winding sections being serially connected, and said auxiliary winding sections being concurrently connected in parallel for operation at a second higher voltage, whereby the motor is capable of producing approximately said predetermined torque level at said second higher voltage.

2. In a multi-voltage single-phase alternating current induction type motor, a first winding comprising at least two groups of coils arranged on a stator core defining a number of operating poles; a second winding carried by the stator core electrically displaced from the first winding; said second winding comprising at least two groups of coils defining a number of operating poles; said second winding connected in series with phase-splitting means and in parallel with said first winding; at least two first winding coil groups being connected in parallel, with at least two second winding coil groups being connected in series for start and run operation at a first lower voltage for producing a predetermined level of output torque; and said first winding coil groups being serially connected, with said second winding coil groups being connected in parallel for start and run operation at a second higher voltage for producing approximately said same predetermined level of output torque.

3. In a dual-voltage single-phase alternating current induction motor of the permanent split-phase capacitor type, a stator member having a core, distributed main and auxiliary windings carried by the core electrically displaced one from the other; each of said windings comprising two sections defining a number of operating poles; said auxiliary winding being connected in series with capacitor means and in parallel with said main winding; said two main winding sections being connected in parallel, and said two auxiliary winding sections being connected in series for starting and running operation at a first lower voltage whereby the motor is capable of producing a predetermined level of output torque at said lower voltage operating condition; and said two auxiliary winding sections being serially connected with said two auxiliary winding sections being connected in parallel for starting and running operation at a second higher voltage, whereby the motor is capable of producing approximately the predetermined level of output torque at this higher voltage operating condition.

4. The stator member of claim 3 in which each of the main and auxiliary winding sections includes at least two coil pluralities which form a number of operating poles, the coil pluralities in the same winding section being serially connected for opertaion at said first lower voltage and at said second higher voltage.

References Cited by the Examiner

UNITED STATES PATENTS

| | | | |
|---|---|---|---|
| 1,912,207 | 5/1933 | Kennedy | 318—225.1 X |
| 2,464,756 | 3/1949 | Trickey | 318—225.1 X |
| 2,808,554 | 10/1957 | Capps | 318—225.1 X |

ORIS L. RADER, *Primary Examiner.*

G. A. FRIEDBERG, G. Z. RUBINSON,
*Assistant Examiners.*